United States Patent
Hodges

(10) Patent No.: US 7,530,644 B2
(45) Date of Patent: May 12, 2009

(54) WHEELS THAT HAVE THE APPEARANCE OF MULTI-PIECE WHEELS

(76) Inventor: Frank J. Hodges, 20624 Mirkwood Run, Yorba Linda, CA (US) 92887

( * ) Notice: Subject to any disclaimer, the term of this patent is extended or adjusted under 35 U.S.C. 154(b) by 22 days.

(21) Appl. No.: 11/507,950

(22) Filed: Aug. 22, 2006

(65) Prior Publication Data
US 2008/0048490 A1 Feb. 28, 2008

(51) Int. Cl.
B60B 7/00 (2006.01)
(52) U.S. Cl. .............. 301/65; 301/37.101; 301/63.101; 301/37.108
(58) Field of Classification Search ............ 301/37.101, 301/37.41, 37.371, 37.43, 37.108, 63.101, 301/63.106, 63.109, 64.101, 64.102, 65, 301/79, 64.201, 64.202, 64.203, 73; D12/204, D12/208, 213; 29/894.35, 894.353, 894.354
See application file for complete search history.

(56) References Cited

U.S. PATENT DOCUMENTS

| | | | | |
|---|---|---|---|---|
| 811,112 | A | * 1/1906 | Wheeler et al. | ............... 301/6.5 |
| 1,414,661 | A | * 5/1922 | Morgan | ........................ 301/79 |
| 1,431,320 | A | * 10/1922 | Minnick | ................ 301/64.203 |
| 2,464,348 | A | * 3/1949 | Roux | .................... 301/63.102 |
| 2,544,387 | A | * 3/1951 | Kerr | ............................ 301/65 |
| 2,955,876 | A | * 10/1960 | Kinsey | ...................... 301/5.21 |
| 3,672,021 | A | * 6/1972 | Schulte et al. | ......... 29/894.324 |
| 4,466,670 | A | 8/1984 | Kaji | |
| 4,969,692 | A | * 11/1990 | Yung | ........................ 301/5.21 |
| 4,997,235 | A | 3/1991 | Braungart | |
| 5,018,566 | A | 5/1991 | Thoni | |
| 5,078,453 | A | 1/1992 | Siwek | |
| 5,096,264 | A | * 3/1992 | Hayashi | ................. 301/64.202 |
| 5,271,663 | A | * 12/1993 | Maldini et al. | ............. 301/5.22 |
| 5,435,629 | A | 7/1995 | Suzuki | |
| 5,558,406 | A | 9/1996 | Melbinger et al. | |
| 5,794,340 | A | * 8/1998 | Pollkotter | ............... 29/894.324 |
| D413,852 | S | 9/1999 | Cullen | |
| D423,442 | S | 4/2000 | Hussaini et al. | |
| D436,567 | S | 1/2001 | Takechi | |
| D436,907 | S | 1/2001 | Ong | |

(Continued)

FOREIGN PATENT DOCUMENTS

FR 2620060 A 3/1989

(Continued)

OTHER PUBLICATIONS

International Search Report and Written Opinion regarding PCT/US2007/076416, filed Jan. 2, 2008.

Primary Examiner—Russell D Stormer
(74) Attorney, Agent, or Firm—Knobbe Martens Olson & Bear LLP

(57) ABSTRACT

Disclosed herein are various embodiments of a one-piece, wheel that is modified to have the appearance of a multi-piece wheel. In certain embodiments, the interior surface of the wheel barrel may be modified such that it is substantially parallel with the wheels axis of rotation. In some embodiments, a plurality of fastening devices such as bolts may be placed through the wheel center. In various embodiments, a groove may be located on the interior surface of the wheel barrel to give the appearance that the barrel comprises multiple pieces.

10 Claims, 8 Drawing Sheets

U.S. PATENT DOCUMENTS

| | | |
|---|---|---|
| 6,244,668 B1 | 6/2001 | Hale, Jr. et al. |
| 6,315,367 B1 | 11/2001 | Lawrence et al. |
| 6,325,462 B1 | 12/2001 | Hummel et al. |
| D455,703 S | 4/2002 | Foose |
| 6,374,493 B1 | 4/2002 | Howald |
| 6,386,642 B2 * | 5/2002 | Maloney et al. .......... 301/37.43 |
| 6,527,346 B2 | 3/2003 | Chen |
| 6,540,450 B2 | 4/2003 | Gatton et al. |
| 6,598,939 B2 | 7/2003 | Muller |
| 6,663,187 B2 * | 12/2003 | Fitzgerald ................ 301/37.25 |
| 6,663,189 B2 * | 12/2003 | Enomoto et al. ......... 301/37.36 |
| 6,820,669 B2 | 11/2004 | Hodges et al. |
| 6,899,400 B1 * | 5/2005 | Cook ....................... 301/37.25 |
| 6,921,138 B2 * | 7/2005 | Smyth ....................... 301/11.1 |
| 6,961,999 B2 * | 11/2005 | Shook ....................... 29/894.35 |
| 7,228,629 B2 * | 6/2007 | Beyer ....................... 29/894.35 |
| 2002/0003373 A1 * | 1/2002 | Hale et al. ............. 301/63.101 |

FOREIGN PATENT DOCUMENTS

| | | |
|---|---|---|
| WO | WO 98/47723 | 10/1998 |
| WO | WO 2005102737 A | 11/2005 |

* cited by examiner

WHEELS THAT HAVE THE APPEARANCE OF MULTI-PIECE WHEELS

BACKGROUND

1. Field of the Invention

The present application relates generally to wheels, and specifically to wheels for supporting vehicles.

2. Description of the Related Art

Wheels may be characterized based on the number of component parts used to make the wheels. As used herein, the term "one-piece wheel" refers to a wheel in which the wheel center and the wheel barrel are unitary. Additional components, such as removable caps, flanges and various other types of parts, can be attached to one-piece wheels, resulting in a wheel that is technically comprised of multiple pieces; however, for purposes of this specification, such wheels are still considered "one-piece" wheels if the wheel center and the wheel barrel are unitary. Some one-piece wheels are manufactured using a casting or molding process, and such wheels are referred to as either "cast" or "molded" wheels. Generally, a molded wheel is formed by pouring or injecting molten metal into a mold and allowing it to cool. As it cools, the metal hardens and takes the shape of the mold. The manufacture of molded or cast one-piece wheels requires a significant capital investment in equipment; however, once this equipment is acquired, wheels may be produced for a relatively low per-unit cost. Consequently, one piece molded or cast wheels are the most common types of wheels.

Forging is another method used to manufacture wheels. In forging, a solid piece of metal, called a billet, is pressed and/or rolled into shape by a large machine (the forge). As with the molding process, a large capital investment must be made to manufacture wheels using the forging process. The forging process allows wheels to be manufactured with much less material and results in wheels that are generally both lighter and stronger than molded wheels. These improved characteristics, along with a higher per-unit manufacturing cost, means that forged wheels are generally more expensive than molded wheels.

One-piece wheels can be manufactured using either the molding or the forging processes, and both processes can also be used to manufacture the component parts of multi-piece wheels. One advantage of multiple-piece wheels is that manufacturers can choose different materials for each component of the wheel. Additionally, multiple-piece wheels allow for the manufacture of different components through different processes. The ability to combine multiple components, with each component possibly being made from a different material and/or by a different process, gives manufacturers greater flexibility in designing and constructing wheels.

As a result of the construction process, two-piece and three-piece wheels have several unique features that are generally not present in one-piece wheels. Moreover, multi-piece wheels are highly desirable due to their broad range of designs, high quality manufacture, and perceived consumer value. Accordingly, it would be advantageous to have one-piece wheels that appear to be multi-piece wheels when mounted on a vehicle. Such wheels would provide consumers with a less-expensive, one-piece wheel that has the design, style, and unique characteristics traditionally associated with multi-piece wheels.

SUMMARY

Each of the embodiments disclosed herein has many features, no single one of which is solely responsible for its improved aspects and/or patentability. Without limiting the scope of this disclosure, some of the features will now be discussed briefly.

In some embodiments disclosed herein, a one-piece wheel comprises a wheel barrel that is unitary with a wheel center and that meets the wheel center at a juncture, and a lip extending along an interior surface of the wheel barrel from an outboard edge to the juncture, the lip being modified after completion of the molding of the wheel such that the lip is substantially parallel to the wheel's axis of rotation. In some embodiments, the lip is modified by machining the interior surface of the wheel barrel. In certain embodiments, the exterior surface of the wheel barrel may also be substantially parallel to the wheel's axis of rotation.

In various embodiments, a one-piece molded wheel comprises a wheel barrel, a wheel center formed unitarily with the wheel barrel and meeting the interior surface of the barrel at a juncture, a plurality of holes extending through the wheel center, each hole being located near the juncture, a plug, such as a bolt extending through each hole, and a nut mated to each bolt. In certain embodiments, the bolts may be placed through the wheel center in an outboard to inboard direction. In some embodiments, at least one washer may be used in connection with the bolt.

In various embodiments, a one-piece molded wheel comprises a wheel barrel having an exterior surface and an interior surface, a wheel center formed as a single piece with the wheel barrel and meeting the interior surface of the barrel at a juncture, a lip extending along the interior surface of the wheel barrel from the outboard edge to the juncture, and a groove on the lip, the groove extending substantially around the circumference of the lip.

Disclosed herein are also methods of manufacturing a wheel, some of which comprise forming a molded wheel having a wheel barrel, a center, and a sloped lip, said wheel barrel having an exterior surface, an interior surface, an outboard edge, and an inboard edge and being generally rotationally symmetrical about an axis, said center being formed as a single piece with the wheel barrel and meeting the interior surface of the barrel at a juncture, said sloped lip extending along the interior surface of the wheel barrel from a first diameter near the outboard edge to a second diameter near the juncture, the first diameter being larger than the second diameter. In certain embodiments, the lip may be modified such that the first diameter near the outboard edge and the second diameter near the juncture are approximately the same. In some embodiments, bolts may be placed through holes in the wheel center and secured in the holes by nuts. In certain embodiments, a groove may be incorporated on the lip, the groove extending substantially around the circumference of interior surface of the wheel barrel. In certain embodiments, the wheel center comprises a register.

Certain embodiments combine one or more features disclosed herein in order to produce a one-piece wheel that has the appearance of a multi-piece wheel. Such wheels are intended to provide consumers with a less-expensive, one-piece wheel that has certain desirable visual characteristics traditionally associated with multi-piece wheels.

DETAILED DESCRIPTION OF THE PREFERRED EMBODIMENTS

When mounted on a vehicle, a wheel has an "inboard" side that faces the interior of the vehicle and an "outboard" side that faces away from the vehicle. As used herein, a feature that extends "radially outwardly" extends form a point, line, or surface closer to the wheel's axis of rotation or symmetry to a point, line, or surface farther away form the wheel's axis of rotation. Conversely, a feature that extends "radially inwardly" extends from a point, line, or surface farther from the wheel's axis of rotation or symmetry to a point, line, or surface closer to the wheel's axis of rotation. In addition, as used herein, terms relating to circles and cylinders, such as "circular," "cylindrical," "diameter," "radius," and "concentric," are not limited to perfectly round structures. Rather, generally circular shapes, including those with large radial protrusions or indentations are also encompassed by these terms. As used herein, the terms "cast" and "molded," or variations thereof, are used interchangeably.

Figure 1:
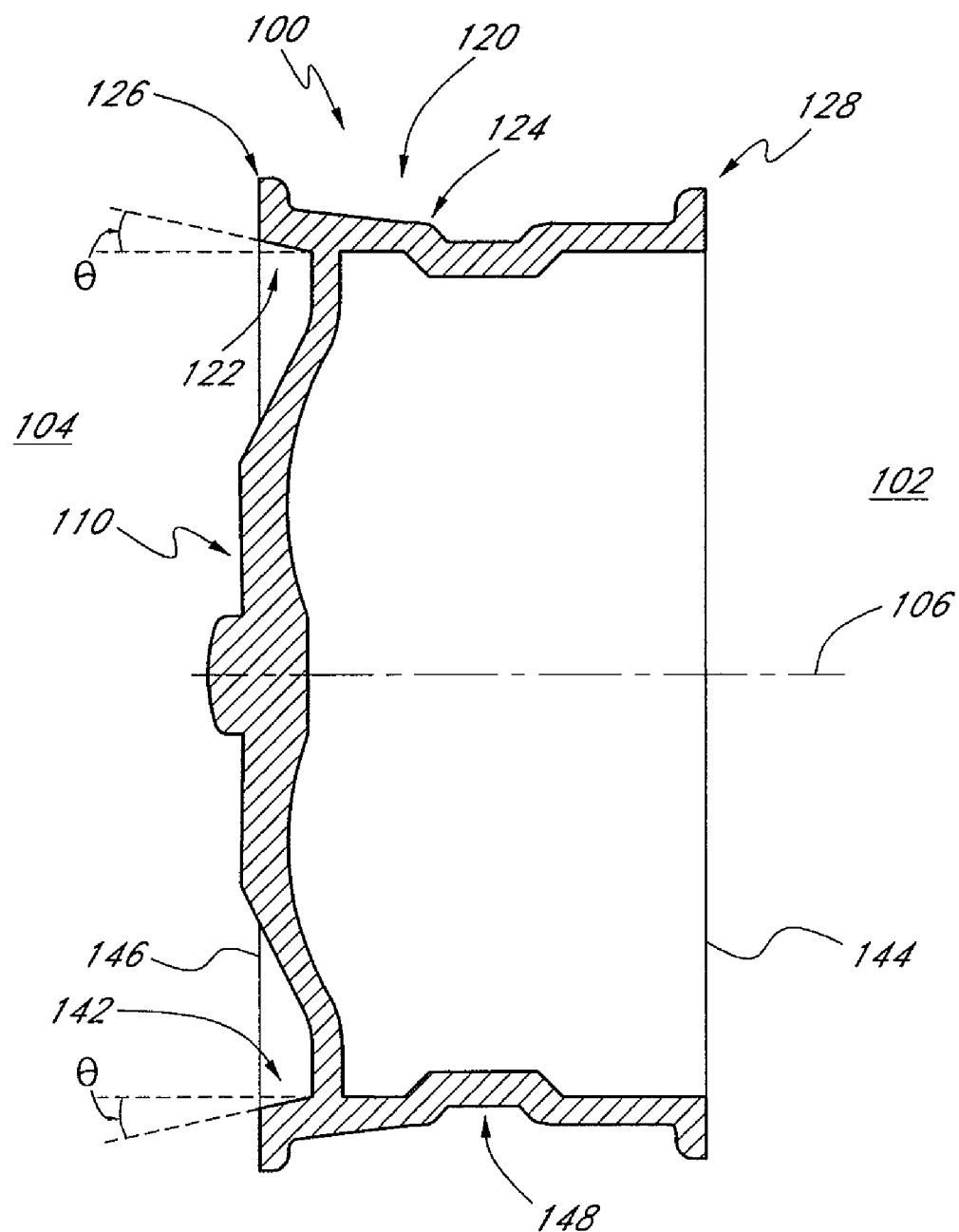
FIG. 1 illustrates an example of a cross-sectional view of a one-piece wheel.

FIG. 1 shows a cross-sectional view of a one-piece wheel 100. The wheel 100 has an inboard side 102 and an outboard side 104, and is generally rotationally symmetrical about an axis 106. The wheel 100 has a center 110 and a barrel 120. The barrel has an interior surface 122 and an exterior surface 124. The center 110 (also known as the central hub, disc, or spider) extends between and is unitary with the interior surface 122 of the wheel barrel 120.

The wheel barrel 120 is disposed radially outwardly from the center 110 and is generally rotationally symmetrical about an axis of symmetry 106. An outboard rim 126 extends radially outwardly from the outboard edge 146 of the wheel barrel 120 away from the axis 106. Similarly, an inboard rim 128 extends radially outwardly from the inboard edge 144 of the wheel barrel 120 away from the axis 106. A portion of the interior surface 122 of the barrel 120 is referred to as the "lip" 142, which extends generally from the outboard edge 146 to the point where the wheel center 110 joins the wheel barrel 120. FIG. 1 also shows a mounting drop 148 positioned along the barrel to assist in mounting a tire (not shown).

As can also be seen in FIG. 1, the lip 142 of a conventional one-piece molded wheel generally is sloped such that the lip 142 has a larger diameter near the outboard edge 146 than it does at the point where the wheel center 110 joins the barrel 120. This slope is represented by the angle θ as shown in FIG. 1. A sloped lip can results from the casting process to enable removal of the mold during the casting process.

Figure 2:
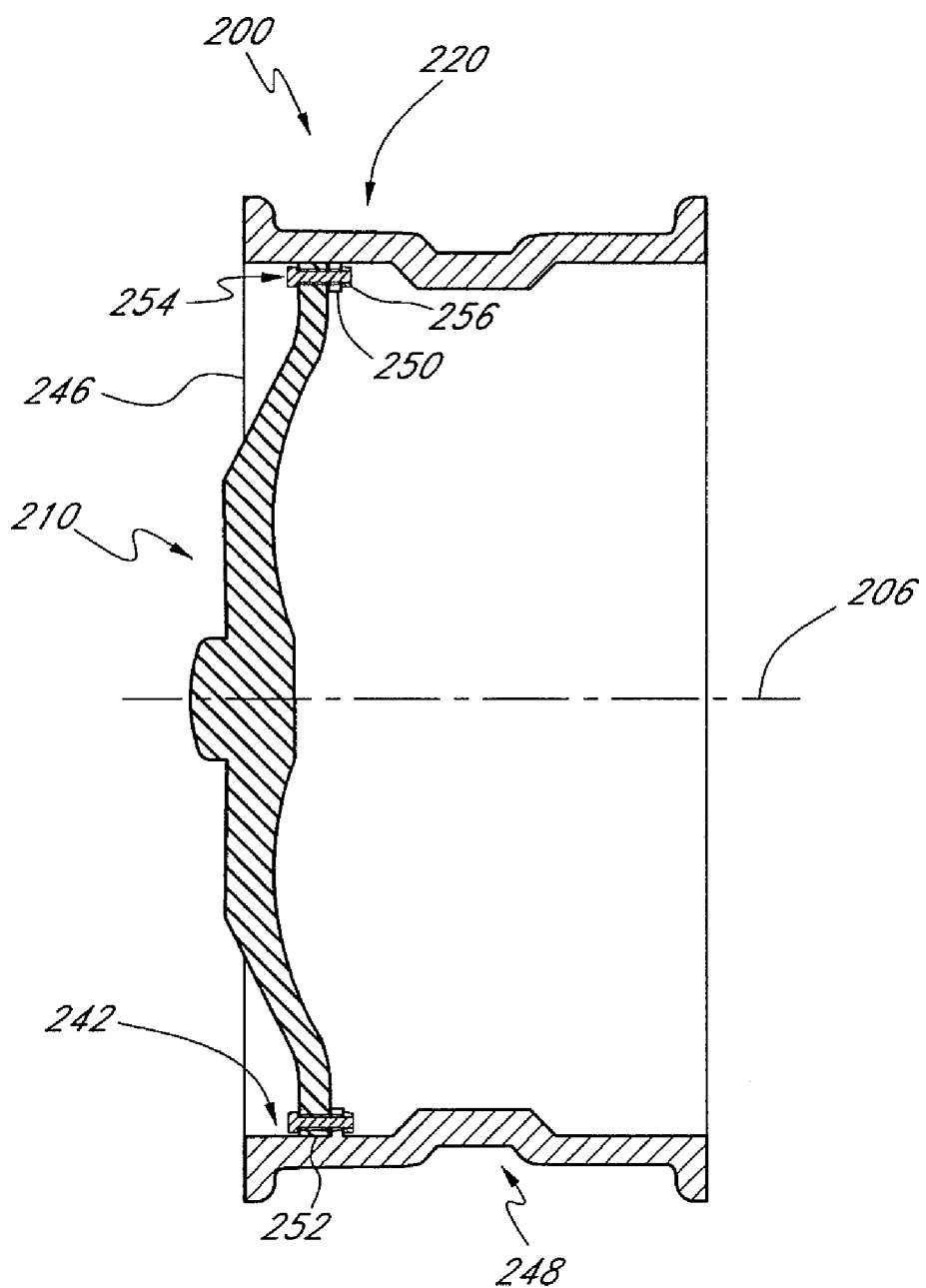
FIG. 2 illustrates an example of a cross-sectional view of a two-piece wheel.

FIG. 2 illustrates a two-piece wheel 200 having a shape generally similar to that of the one-piece wheel 100 shown in FIG. 1. As shown, the wheel barrel 220 and the wheel center 210 may be formed as distinct components that are manufactured separately. The barrel 220 comprises a radially inwardly extending register 250, which allows the center 210 to be secured to the barrel 220 at a juncture 252 by any known method, such as by bolts 254 and corresponding nuts 256 as shown.

As can be seen in FIG. 2, the lip 242 of a two-piece wheel is generally not sloped because the barrel 220 is manufactured separately from the center and therefore no slope is necessary to remove the mold during the molding process. Accordingly, in two-piece and three-piece wheels, the diameter of the lip 242 generally is constant from the outboard edge 246 to the juncture 252.

Figure 3:
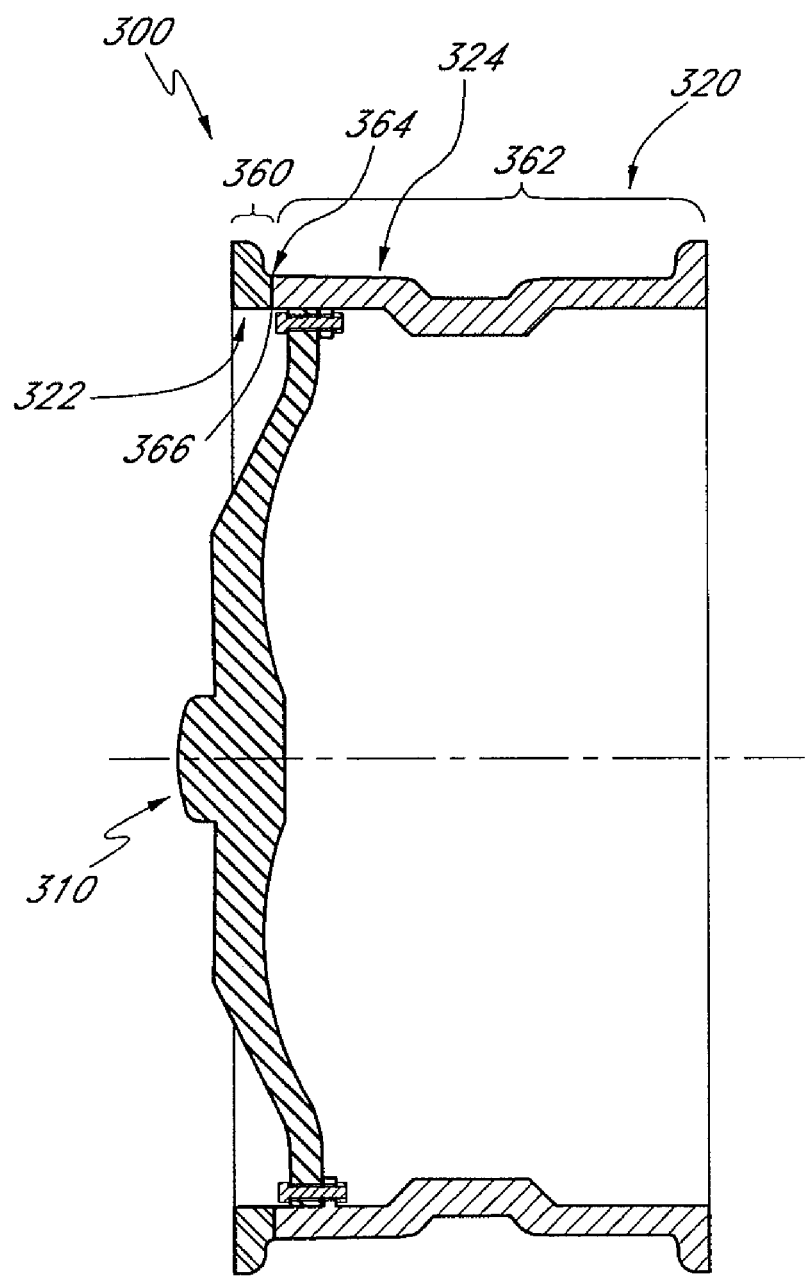
FIG. 3 illustrates an example of a cross-sectional view of a three-piece wheel.

FIG. 3 illustrates a three-piece wheel 300. Like the two-piece wheel illustrated in FIG. 2, the illustrated three-piece wheel has a center 310 and a barrel 320. However, in this wheel, the barrel 320 comprises two component parts, referred to as the outer barrel 360 and the inner barrel 362. The outer barrel 360 and the inner barrel 362 may be constructed from different materials and/or by different processes. Because the outer barrel 360 and inner barrel 362 are separate components, they may be secured together by various means, such as by a weld 364 that extends around at least a portion of the circumference of the exterior surface 324. Because the outer barrel 360 and inner barrel 362 are secured by this method, there is often a groove 366 on the interior surface of the barrel where the outer barrel 360 and the inner barrel 362 join.

Figure 4:
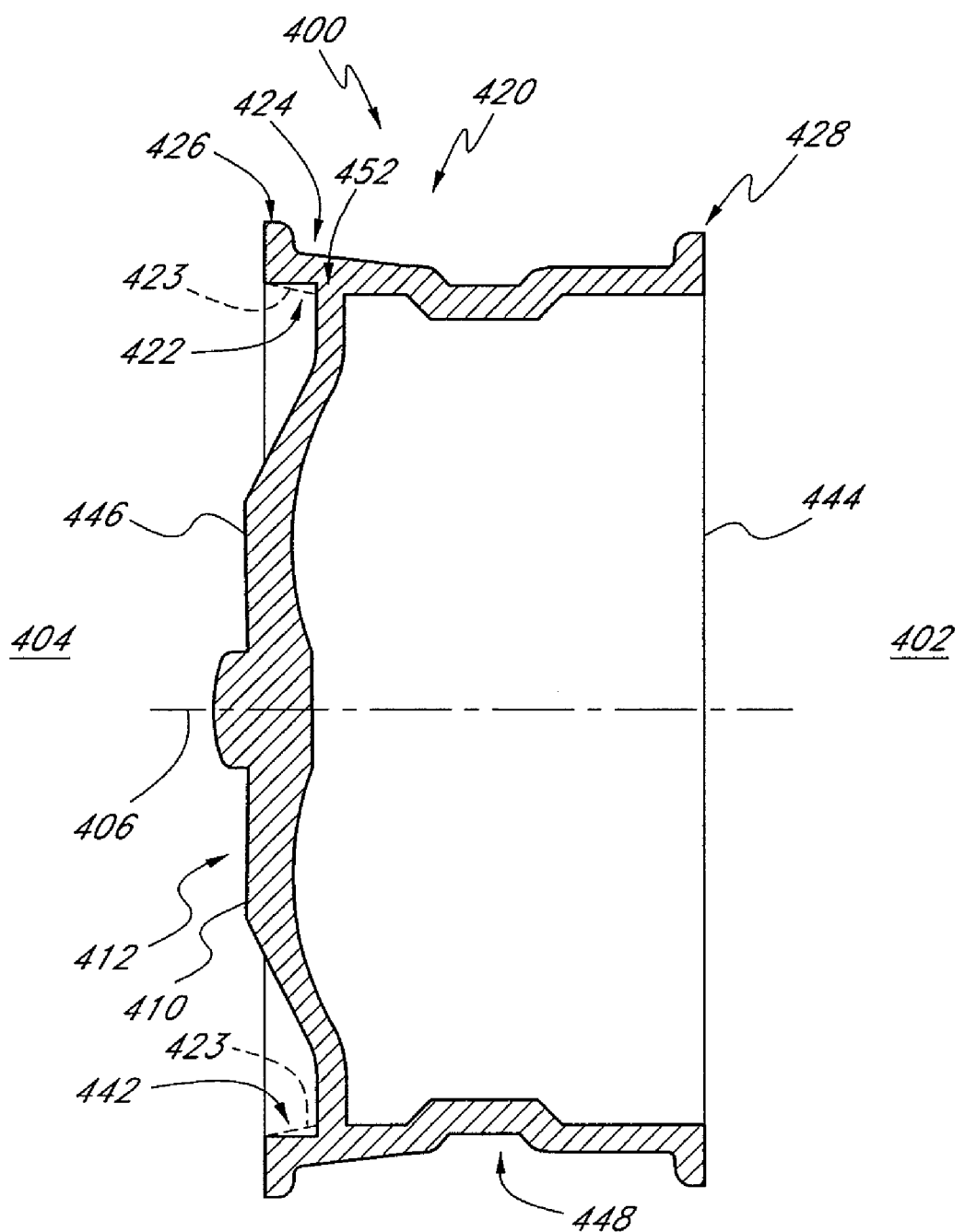
FIG. 4 illustrates a cross-sectional view of a one-piece wheel in accordance with an embodiment of the present application.

FIG. 4 illustrates an embodiment of a one-piece wheel disclosed herein. The basic form of the illustrated wheel can be molded into shape. The one-piece cast wheel 400 comprises a center 410 and a wheel barrel 420, the center 410 and barrel 420 being unitary and having a juncture 452. The center 410 can comprise a plurality of spokes extended from a central portion radially outwardly toward the wheel barrel 420. The wheel 400 has a generally outboard side 404, a generally inboard side 402, an inboard edge 444, and an outboard edge 446. The wheel 400 is generally rotationally symmetrical about the axis 406. The wheel 400 also has an outboard rim 426 and an inboard rim 428. The wheel 400 may be formed from any material suitable for use as a vehicle wheel, including various metals such as aluminum or metal alloys.

The wheel barrel 420 has an interior surface 422 and an exterior surface 424. The interior surface 422 of the barrel forms a lip 442, which extends generally from the outboard edge 446 to the juncture 452. In some embodiments, as illustrated in FIG. 4, the lip 442 may be modified so that the diameter of the inner surface of the barrel remains substantially constant from the outboard edge 446 to the juncture 452. As described above in connection with FIG. 1, the lip 442 of a molded wheel is generally sloped. In FIG. 4, this original sloped lip is identified by a dashed line 423. Thus, as can be seen from FIG. 4, after modification the wheel more closely resembles a two- or three-piece wheel in that it no longer has a sloped lip 442. In some embodiments, the wheel barrel 420 is not separable into multiple pieces between the outboard rim and the inboard rim. For example, in some embodiments, the structural parts of the wheel barrel 420 are of unitary composition. Additional plates, flanges, connectors, and other components can be added to a wheel barrel 420 in which the structural parts of the wheel barrel 420 are of unitary composition. In general, the structural parts of the wheel barrel are those parts needed to maintain the fundamental structural integrity of the wheel barrel.

The lip 442 can be modified by any of a number of methods, such as by machining. In some configurations, such as where at least a portion of the mounting drop 448 is located closer to the outboard edge 446 than is the juncture 452, the mounting drop 448 may prevent the entire lip 442 from being modified.

In various embodiments disclosed herein, and as illustrated in FIG. 4, the exterior surface 424 of the wheel barrel 420 may have a sloped configuration as a result of the casting process. Accordingly, the exterior surface 424 may be modified in a similar manner to the lip 442 such that the exterior surface 424 is also substantially parallel to the axis 406. In some embodiments, the casting process produces a wheel with an exterior surface 424 that is substantially parallel to the axis 406 and therefore no modification of the exterior surface 424 is needed.

The center 410 may join the barrel 420 at any point between the inboard edge 444 and the outboard edge 446, as will be recognized by those of skill in the art. Furthermore, as illustrated in FIG. 4, the juncture 452 is located closer to the outboard edge 446 than is the mounting drop 448. However, the present application is not limited to this configuration; the center 410 may join the barrel 420 at any point between the outboard edge 446 and the inboard edge 444 irrespective of the location, configuration, or shape of the mounting drop 448.

In the embodiment illustrated in FIG. 4, the outboard rim 426 and inboard rim 428 are equidistant from the axis 406. However, the present application is not limited to such a configuration and either the outboard rim 426 or the inboard rim 428 may extend radially outwardly from the axis 406 beyond the other rim. For example, the wheel may have an extended flange as disclosed in U.S. Pat. No. 6,820,669, which is hereby incorporated by reference for all that it discloses.

FIG. 4 also shows a mounting drop 448 positioned along the barrel to assist in mounting a tire (not shown). The mounting drop shown in FIG. 4 illustrates a discrete depression in the exterior surface 424 of the wheel barrel 420, and a corresponding bulge on the interior surface 422. The depth of the bulge on the interior surface 422 may or may not correspond to the depth of the depression in the exterior surface 424. Additionally, the mounting drop may be not be a discrete depression with walls as illustrated, but may take on various configurations to assist in the mounting of a tire. Alternatively, the wheel may not have a discrete depression, but may rely instead on the shape of the barrel to facilitate the mounting of a tire.

The outboard surface of the center 410 comprises the wheel face 412. The wheel face 412 may comprise a decorative, highly reflective layer of metal such as chrome and may be applied through an electrical or chemical plating process. The wheel face 412 may comprise such decorative structures as multiple spokes, hollows, flanges, contours, surfaces, loops, stars, rays, decorative lines, etc. Thus, the true cross-section along a given plane of the center 410 may not actually be a continuous surface as illustrated in FIG. 4. The center 410 is illustrated in cross-section merely to show the general presence of a center 410 in this embodiment and its general shape, though the center may contain interrupted lines representing grooves, hollows, or spaces in any given cross-sectional plane. The center 410 may also be adorned with any design or combination of designs.

Figure 5A:
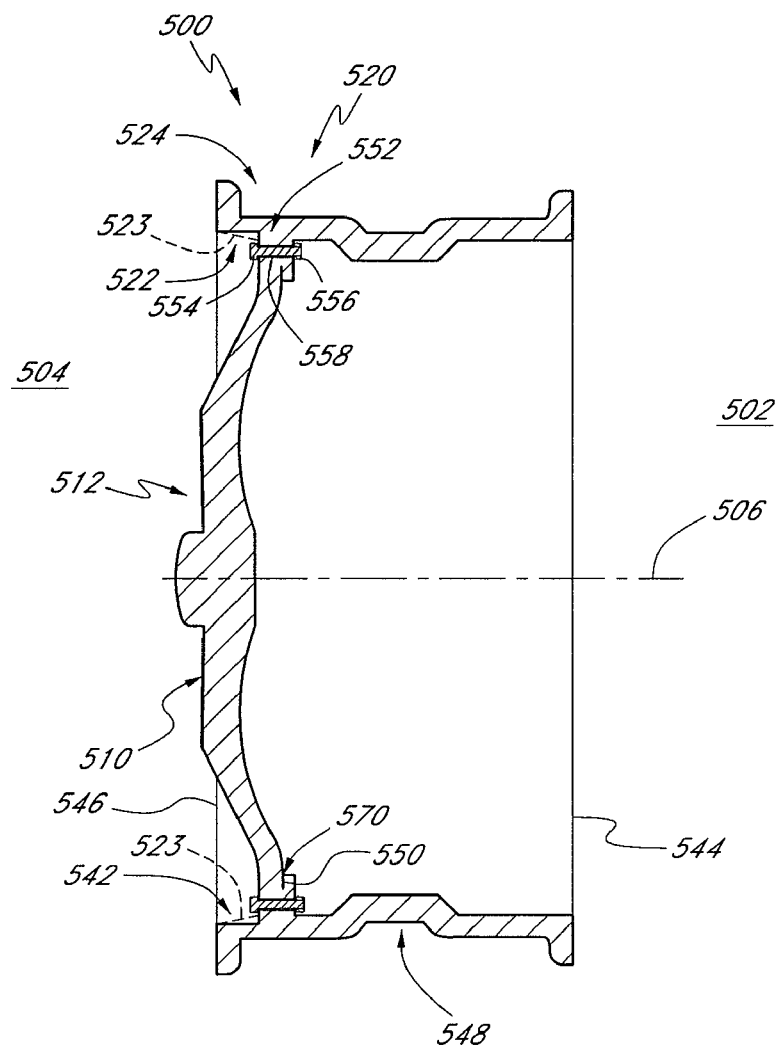
FIG. 5A illustrates a cross-sectional view of a one-piece wheel in accordance with another embodiment of the present application.

FIG. 5A illustrates another embodiment disclosed herein. The wheel is similar in many respects to the wheel described in connection with the embodiment illustrated in FIG. 4. With reference to FIG. 5A, the one-piece wheel 500 has a center 510 and a barrel 520, which are unitary and meet at a juncture 552. As previously described, the interior surface of the barrel 522 may be modified from its original molded shape such that it is substantially parallel to the axis of rotation 506. The original molded shape, which comprises a sloped lip, is shown in FIG. 5 using dashed lines 523. In the embodiment depicted in FIG. 5A, the exterior surface 524 of the barrel is also substantially parallel to the axis of rotation 506. The wheel barrel 520 may be modified by any of a variety of ways known in the art for shaping metal, including machining.

Figure 5B:
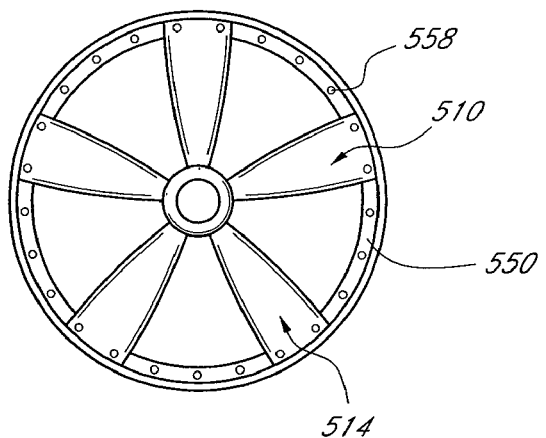
FIG. 5B illustrates a perspective view of the one-piece wheel illustrated in FIG. 5A.

As shown in FIGS. 5A and 5B, a plurality of holes 558 may extend through the center 510. Although the holes 558 may be located at any point on the wheel center 510, the holes 558 are preferably located near the juncture 552. In some embodiments, at least some of the holes 558 extend through spokes in the center 510. The holes need not be located the same distance from the axis of rotation 506; however, in a preferred embodiment, the holes 558 are substantially equidistant from the axis of rotation 506, such that the holes 558 define a substantially circular pattern when viewing the wheel from the outboard side 504. Preferably, the holes 558 are evenly spaced around the circumference of the substantially circular pattern, as shown in FIG. 5B.

A plug, such as a bolt 554, may be placed through the hole 558 and a nut 556 may be mated to the bolt on the inboard side of the center 510. Any number of bolts 554 may be placed through the wheel center 510 depending on the desired wheel design and configuration. In some embodiments, at least one bolt 554 is provided for each spoke. In some embodiments, at least five bolts 554, or at least ten bolts 554, or at least twenty bolts 554, are provided along the juncture between the wheel barrel 522 and the center 510. As shown, the bolt 554 may be inserted into the hole 558 in an outboard to inboard direction so that the head of the bolt 554 is located on the outboard side 504 of the wheel center 510 and the nut 556 is located on the inboard side 502 of the wheel center 510. However, the bolt 554 may alternatively be inserted in the opposite direction, such that the nut 556 is located on the outboard side 504 of the wheel center 510. Additionally, the bolt 554 may extend through the nut 556, such that a portion of the bolt 554 extends beyond the nut 556. Furthermore, at least one washer (not shown) may be used in conjunction with the bolt 554 and nut 556.

This configuration creates the appearance that the bolts 554 and nuts 556 are securing the wheel center 510 to the wheel barrel 520, as is the case in multi-piece wheels. In fact, in the illustrated embodiment, the wheel center 510 is unitary with the wheel barrel 520. The bolts 554 and nuts 556 are not necessary to maintain the structural integrity of the wheel 500. Further, in some embodiments, the bolts 554 do not assist in mounting the wheel 500 to the vehicle. Also, in some embodiments, the bolts 554 do not assist in mounting or securing any other components to the wheel 500.

In another embodiment, the hole 558 may be threaded, and the bolt 554 may be placed into the threaded hole 558 in the wheel center 510. In such an embodiment, the nuts 556 may not be necessary to secure the bolts 554. Alternatively, the holes 558 may not extend through the entire center 510.

However, preferably the bolts 554 extend through the center 510 such that one who looks or reaches between the spokes of the wheel center 510 to see or feel the back of the bolts 554 will feel nuts 556 secured to the bolts 554, thus giving the appearance of a multi-piece wheel.

As described above with reference to FIG. 4, it is contemplated that the wheel face 512 may comprise such decorative structures as multiple spokes, hollows, flanges, contours, surfaces, loops, stars, rays, decorative lines, etc. Thus, the true cross-section along a given plane of the center 510 may not actually be a continuous surface as illustrated in FIG. 5A. The center 510 is illustrated in cross-section merely to show the general presence of a center 510 in an embodiment and one possible shape, though the center may contain interrupted lines representing grooves, hollows, or spaces in any given cross-sectional plane. Further, the center may take on any of a variety of shapes. For example, the center may be substantially flat across its face, or may take on a substantially conical or circular shape.

Accordingly, in various embodiments disclosed herein, the one-piece wheel 500 may be molded with any of a number of designs for the wheel center 510 which may contain spokes 514, as illustrated in FIG. 5B. In such a case, the wheel 500 may be molded to contain a register 550, similar to the register 250 illustrated in FIG. 2. In the one-piece wheel 500, the register 550 may be considered either a part of the wheel center 510 or the wheel barrel 520. As described herein, the register 550 of a one-piece wheel is generally considered to be a part of the wheel center 510 and the register 550 may be formed unitarily with the wheel center 510. Thus, when describing holes 558 in the wheel center 510 through which bolts 554 may be placed, the description includes the placement of holes 558 and bolts through the register 550 alone, as well as through any spoke 514. In some embodiments, the register includes at least one bolt 554, or at least two bolts 554, or at least five bolts 554, between each spoke. In some embodiments, the wheel includes at least twenty bolts 554 on the register in the aggregate. In some embodiments, the nuts 556 and/or bolts 554 are not placed through the spokes 514, but instead are placed only through the register 550. As with the bolts 554 and nuts 556, the register may not be necessary to the structural integrity of the wheel 500. In some embodiments, the bolts 554 extend through the register 550 to give the appearance of a multi-piece wheel.

As is illustrated in FIG. 5A, the register 550 may be formed to appear to be distinct and separable from the wheel center 510. Accordingly, in some embodiments, the register 550 may extend around the circumference of the wheel barrel 520 and appear to pass behind the spokes 514 when viewed from the outboard side 504. In such embodiments, a channel 570 may be incorporated to give the appearance that the wheel center 510 and the register 550 are separate pieces, when in fact they are unitary. The channel 570 may be of varying depths and widths, and may have rounded corners. Further, the interior of the channel may take any of a number of shapes, and is preferably shaped to simulate the connection of the wheel center and register in multi-piece wheels.

Alternatively, the register 550 may not extend behind the spokes 514, but may instead extend only between the spokes 510. Such an embodiment may also give the appearance of a multi-piece wheel when viewed from the outboard side 504, but would not have the register 550 passing behind the spokes 514 upon closer inspection. In such an embodiment, there may not be any channel 570. Of course, any combination of register size and thickness may be chosen. For example, the register 550 may not pass behind the spokes 514, but may only be half the thickness of the wheel center 510 (or spokes 514), thereby appearing from the front to pass behind the spokes 514, when in fact the register 550 does not. In another embodiment, the register 550 may be molded to appear to pass on the outboard side 504 of the wheel center 510 or spokes 514. This configuration may also take on similar variations to those discussed above.

As with the embodiments depicted in FIG. 4, the embodiments described above may apply to any of a number of wheel configurations. For example, the wheel center 510 may take any shape as it approaches the juncture 552. In a preferred embodiment, the wheel center 510 is configured to be substantially perpendicular to the axis of rotation 506 near the juncture. Similarly, the wheel center 510 may join the wheel barrel 520 at any position between the outboard edge 546 and the inboard edge 544. Furthermore, while FIG. 5A illustrates a discrete depression for the mounting drop 548, the embodiments described herein will apply equally to those wheels having alternative mounting drop designs.

In some embodiments, the bolts 554 and nuts 556 described herein may not be removable components of the wheel 500. In an illustrated embodiment, the bolts 554 and/or nuts 556 are removable, because such a feature would result in a wheel 500 that more closely resembles a multi-piece wheel. In other embodiments, however, the mold may be shaped such that the bolts 554 and/or nuts 556 are unitary with the wheel center 510 when the wheel 500 is removed from the mold. In effect, the bolts 554 and/or nuts 556 can form part of a molded, cast, or forged decorative surface structure. In some embodiments, the wheel can be machined to give the appearance that separate bolts 554 and/or nuts 556 are present, when in fact they are unitary with the wheel center 510.

The bolts 554 and/or nuts 556 described herein may be replaced by any of a number of other plugs that appear to function as fasteners known in the art, such as rivets, screws, rods, pins, etc.

Figure 6:
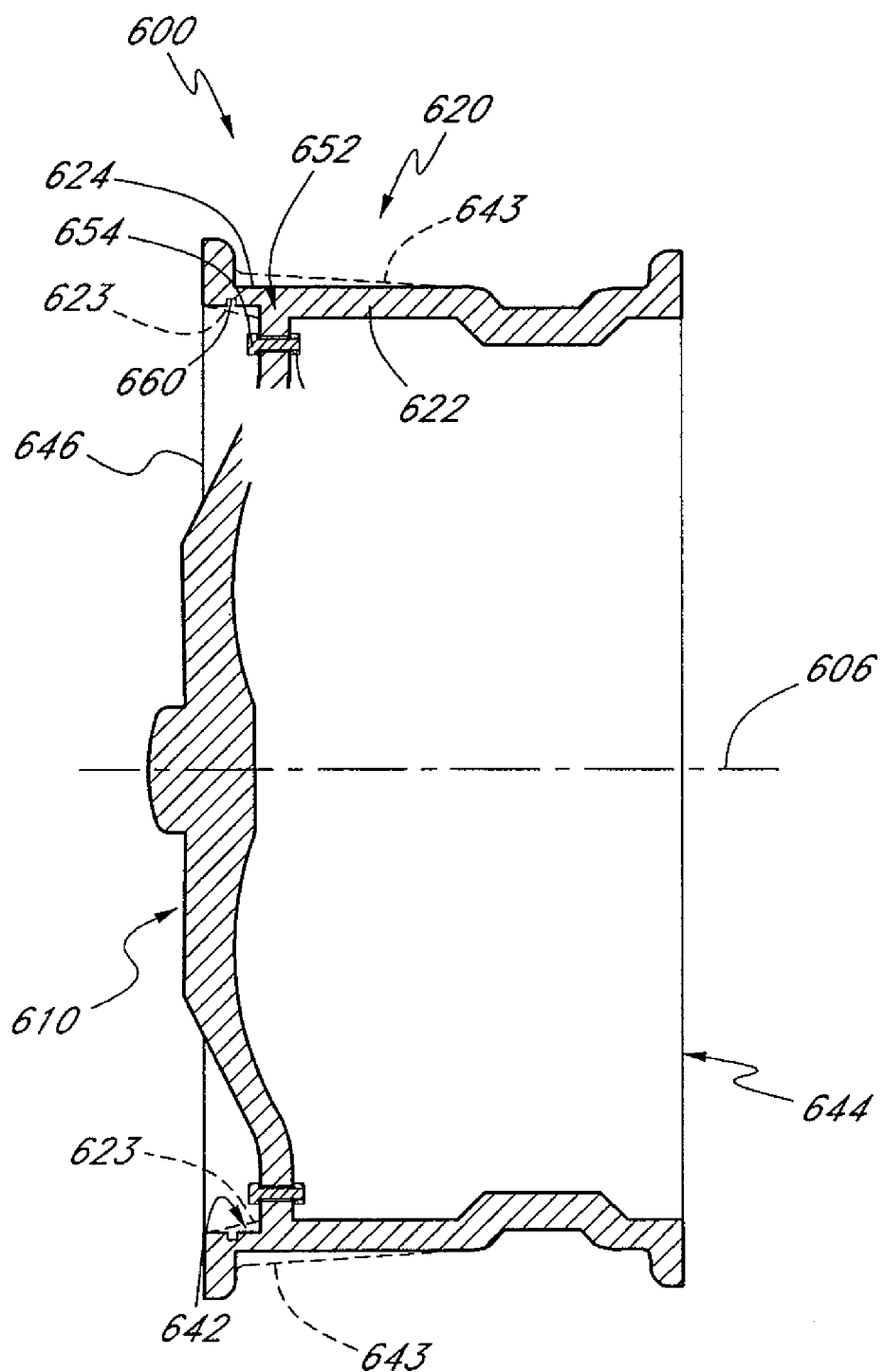
FIG. 6 illustrates a cross-sectional view of a one-piece wheel in accordance with an embodiment of the present application.

FIG. 6 illustrates another embodiment of a wheel. The one-piece wheel 600 has a center 610 and a barrel 620, which are unitary and connect at a juncture 652. The wheel 600 can be molded. A groove 660 is located on the interior surface 622 of the wheel barrel 620. The groove 660 gives the appearance that the wheel barrel 620 comprises two separate pieces, as is commonly found in three-piece wheels as described in connection with FIG. 3. The groove 660 may be located at any position along the interior surface 622 between the outboard edge 646 and the inboard edge 644, but is preferably located between the outboard edge 646 and the juncture 652. Preferably, the groove 660 extends the entire circumference of the interior surface 622. The groove 660 may be of any width or depth; however, the width and depth are preferably chosen to give the appearance of the groove found on multi-piece wheels. The groove 660 may be created by any one of a number of methods known in the art, including but not limited to machining, etching, or engraving. Further, the bolts 654 and nuts 656 in this and other embodiments can be molded or otherwise formed in the wheel 600 in a manner different from the conventional method, or protruding structures in the wheel can be molded or otherwise to give the appearance of bolts 654 and nuts 656 as shown. Because the bolts 654 and nuts 656 are not used for structural support, but rather to create the appearance of a multi-piece wheel, they need not be constructed using the standard methods, structures, or materials.

Although FIG. 6 combines multiple embodiments of the present invention, such a combination is not necessary. For example, in addition to the groove 660, FIG. 6 depicts a one-piece wheel in which the interior lip 642 has been modified from its original inboard surface 643 such that it is substantially parallel to the axis of rotation 606, as well as an exterior surface 624 that has been modified from its original outboard surface 623 such that it is substantially parallel to the axis of rotation 606. The wheel 600 in FIG. 6 also contains a plurality of bolts 554 and nuts 556. Although the combination of these embodiments represents a preferred embodiment because it results in a one-piece wheel that closely resembles a multi-piece wheel, such a combination is not necessary.

Figures 7A, 7B:
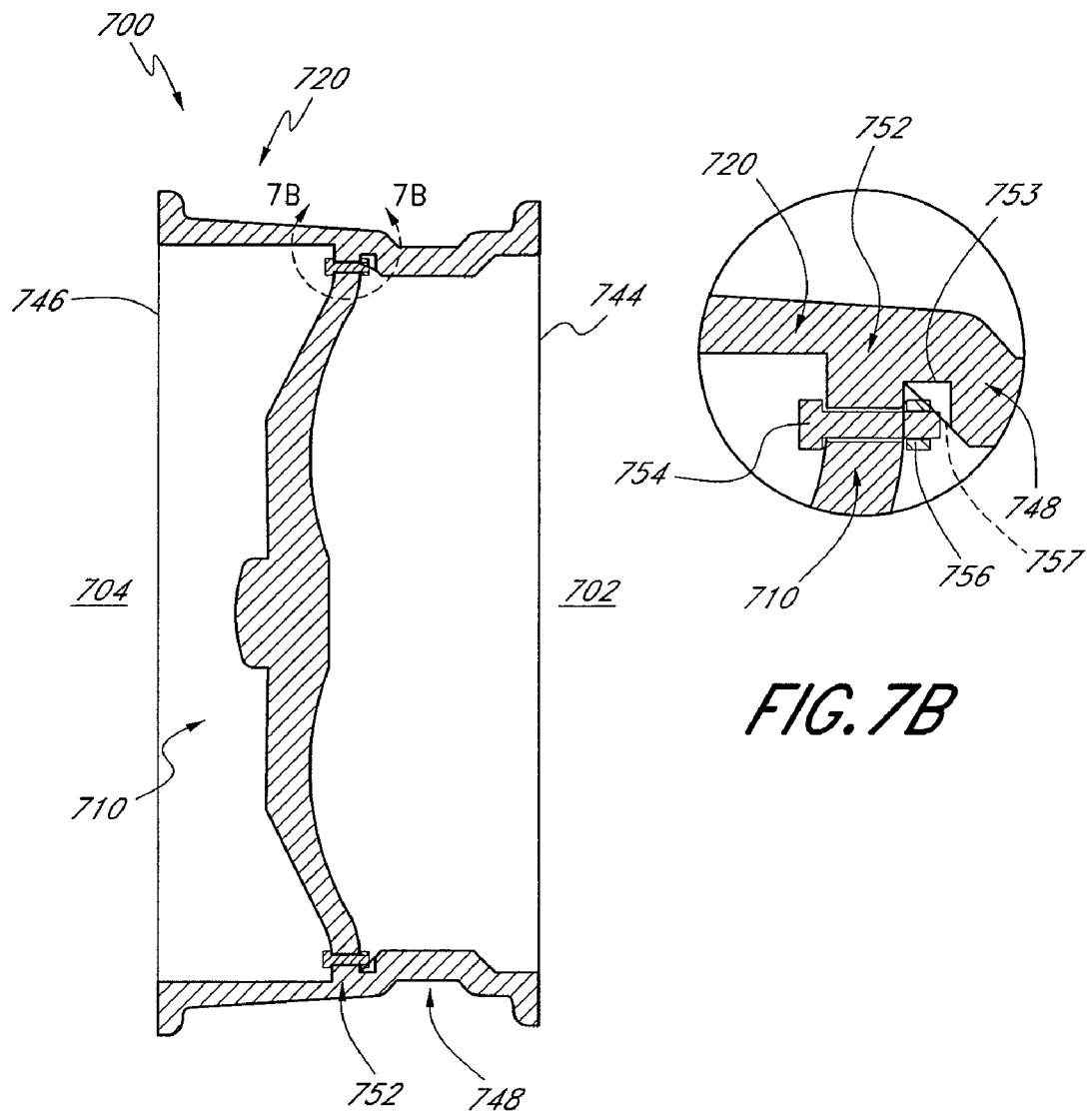
FIG. 7A illustrates a cross-sectional view of a one-piece wheel in accordance with an embodiment of the present application.
FIG. 7B illustrates a cross-sectional view of a portion of the one-piece wheel illustrated in FIG. 7A.

FIGS. 7A and 7B illustrate another embodiment of a wheel. These figures illustrate a one-piece wheel 700 having a center 710 and a barrel 720, the center 710 and barrel 720 being unitary and connecting at a juncture 752. As has been described above in connection with other embodiments disclosed herein, the juncture 752 may be located at any point along the barrel 720. That is, the wheel center 710 may connect with the barrel 720 at any point between the outboard edge 746 and the inboard edge 744. Additionally, the mounting drop 748 may be positioned at any location along the wheel barrel 720, and may take on a variety of shapes and sizes. Therefore, although the illustrations provided herein generally show the wheel center 710 connecting to the barrel 720 on the outboard side 704 of the mounting drop 748, and closer to the outboard edge 746 than the inboard edge 744, the embodiments disclosed herein are not limited to such a configuration.

For example, as illustrated in FIG. 7A, the wheel center 710 may meet the wheel barrel 720 at a location just outboard of the mounting drop 748. In such a configuration, i.e. where the juncture 752 is positioned near the outboard side 704 of the mounting drop 748, there may be inadequate clearance between the inboard side 702 of the center 710 and the original interior surface 757 of the mounting drop 748 for the bolt 754 to extend through the center 710 and/or inadequate clearance for the placement of a nut 756. As shown in FIG. 7B, the interior surface of the mounting drop may be modified to form a recess 753 to accommodate the bolt 754 and/or nut 756. Such modification may be by any method known in the art, such as machining.

While the mounting drop 748 may be the obstruction in the embodiment illustrated in FIGS. 7A and 7B, it is recognized that, depending on the shape of the cast wheel, various other obstructions besides the mounting drop 748 may initially prevent the bolt 754 from passing through the wheel center 710, or prevent one from securing a nut 756 to the bolt 754.

Figure 8:
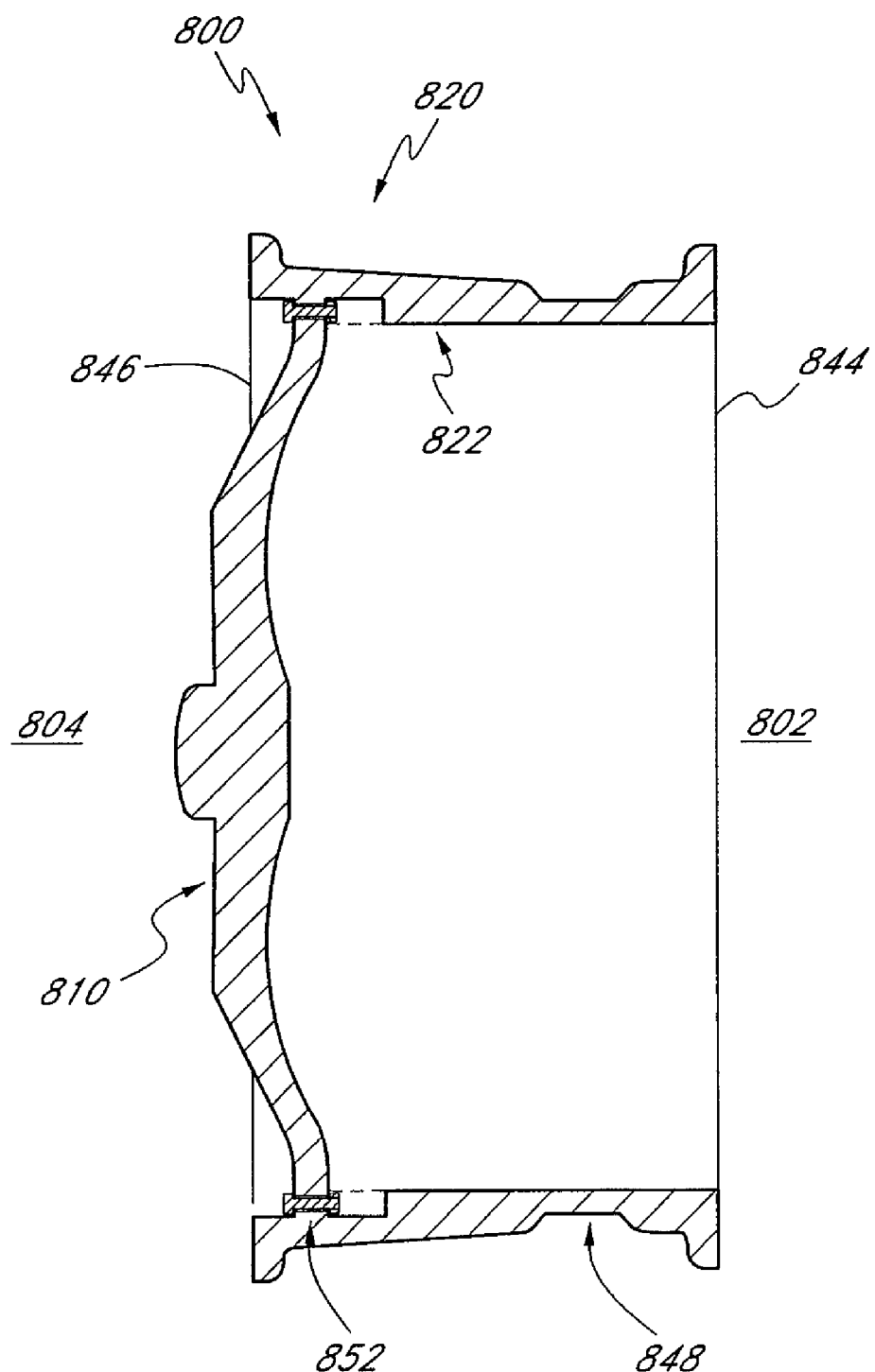
FIG. 8 illustrates a cross-sectional view of a one-piece wheel in accordance with an embodiment of the present application.

For example, the portion of the wheel barrel that extends from the juncture 852 to the inboard edge 844 may be thicker than the portion of the wheel barrel that extends from the juncture 852 to the outboard edge 846. This embodiment is illustrated in FIG. 8. As illustrated, the portion of the wheel barrel 820 between the juncture 852 and the inboard edge 844 is generally thicker than the portion of the barrel that extends from the juncture 852 to the outboard edge 846. In such a case, the shape of the molded wheel may prevent the bolts 854 from extending through the wheel center 810 and exiting the wheel center 810 on the inboard side 802. Accordingly, a portion of the interior surface 822 of the wheel barrel 820 may be modified to allow the holes 858 and bolts 854 to penetrate through the wheel center 810 to the inboard side 802 of the wheel center 810. The modification may be accomplished through any of a variety of methods known in the art, including but not limited to machining.

The embodiment of FIG. 8 is not limited to the wheel shape disclosed therein. The wheel barrel 820 may be originally cast into a wide variety of shapes, and any of these shapes may require some modification to the interior surface 822 of the inboard side 802 of the barrel 820 to allow for the bolts 854 and nuts 856 to be secured in position. In particular, because the bolts 854 and nuts 856 are preferably located at a position on the wheel center that is near the interior surface 822 of the wheel barrel 820, the shape of the juncture 852 will often play a role in whether any modification is necessary to allow for the placement of the bolts 554 and nuts 556. There is often extra mass at the point where the wheel center 810 and the wheel barrel 820 meet, even though the thickness of the barrel 820 is relatively constant otherwise. It is often the shape of this juncture that will require modification before the bolts 854 and nuts 856 can be secured.

The foregoing description sets forth various preferred embodiments and other exemplary but non-limiting embodiments. While the description gives some details regarding illustrative combinations and modes of the disclosed embodiments, other variations, combinations, modifications, modes, and/or applications of the disclosed feature and aspects of the embodiments are also within the scope of this disclosure, including those that become apparent to those of skill in the art upon reading this specification. In particular, it is contemplated that the various materials, dimensions, angles, shapes, sizes, and structures of each of the different disclosed embodiments may be used interchangeably and/or combined to form other embodiments. The scope of the inventions claimed herein is not limited by the foregoing description; rather, the scope is limited only by the claims.

What is claimed is:

1. A one-piece wheel configured to be mounted on a vehicle, the wheel comprising:
   a wheel barrel with a radially inward surface and a radially outward surface;
   a wheel center with spokes formed as a unitary piece with the wheel barrel, the center meeting the barrel at a juncture, and the spokes having an outboard side and an inboard side;
   a register formed on the wheel center and extending substantially radially inwardly from the wheel barrel, the register having an outboard side and an inboard side;
   a substantially circumferential groove machined into the radially inward surface of the wheel barrel;
   a plurality of holes extending through the register or spokes near the juncture, the holes extending from the outboard side to the inboard side of the spokes or register; and
   a plurality of plugs extending through the holes, the plugs comprising an outboard end and an inboard end and the plugs not being needed to secure the wheel center to the wheel barrel; and
   a plurality of nuts secured to inboard ends of the plugs, the nuts being positioned at least partially within the groove.

2. The wheel of claim 1, wherein the plugs comprise bolts extending through the holes and wherein each of the plurality of nuts is removably mated to one of the plurality of bolts and positioned against an inboard side of the register or the spokes.

3. The wheel of claim 2, wherein the bolts are placed through the wheel center in an outboard to inboard direction.

4. The wheel of claim 3, the groove being configured to create the appearance that the wheel barrel was formed from separate pieces.

5. The wheel of claim 2, wherein at least a portion of the wheel center through which the bolt is placed is substantially perpendicular to the wheel barrel.

6. The wheel of claim 1, wherein the wheel is molded and the wheel barrel extends between an inboard edge and an outboard edge and being generally rotationally symmetrical about an axis, and further comprising a lip extending along the radially inward surface of the wheel barrel from the outboard edge to the juncture, the lip being modified after completion of molding of the wheel such that the lip is substantially parallel to the axis.

7. The wheel of claim 6, wherein the structural parts of the wheel barrel are not separable into multiple pieces between the outboard rim and the inboard rim, the groove extending substantially around the circumference of the radially inward surface of the wheel barrel and the groove giving the appearance that the wheel barrel has an inboard portion that is separable from an outboard portion of the wheel barrel.

8. A one-piece molded wheel configured to be mounted on a vehicle, the wheel comprising:
  a molded wheel barrel comprising a radially inward surface and a radially outward surface, the wheel barrel extending between an inboard edge and an outboard edge and being generally rotationally symmetrical about an axis;
  a molded wheel center that is a single unitary piece with the wheel barrel, the center meeting the interior surface of the barrel at a plurality of junctures without requiring additional structures to secure the center to the barrel;
  a substantially circumferential region that extends radially inwardly into the radially inward surface of the wheel barrel;
  a plurality of holes extending through the wheel center or the radially inwardly extending region;
  a plurality of bolts extending through the plurality of holes and a plurality of nuts mated to the plurality of bolts, the nuts being positioned at least partially within the substantially circumferential, radially inwardly extending region; and
  a lip extending along the radially inward surface of the wheel barrel from the outboard edge to the juncture.

9. The wheel of claim 8, wherein the lip is modified after completion of the molding of the wheel such that the lip is substantially parallel to the axis.

10. A method of manufacturing a wheel, comprising:
  forming a molded one-piece wheel having a wheel barrel, a center with spokes and a register, and a sloped lip, said wheel barrel having a radially inward surface and a radially outward surface, an outboard edge, and an inboard edge, and said wheel being generally rotationally symmetrical about an axis, said center being formed as a single unitary piece with the wheel barrel, said sloped lip extending along the radially inward surface of the wheel barrel from a first diameter near the outboard edge to a second diameter near the juncture, the first diameter being larger than the second diameter;
  machining a groove on the lip that extends substantially around the circumference of the radially inward surface of the wheel barrel;
  modifying the lip such that the first diameter near the outboard edge and the second diameter near the juncture are substantially the same length; and
  placing bolts through holes in the spokes or register and mating the bolts to nuts positioned at least partially within the groove.

* * * * *

UNITED STATES PATENT AND TRADEMARK OFFICE
CERTIFICATE OF CORRECTION

| | | |
|---|---|---|
| PATENT NO. | : 7,530,644 B2 | Page 1 of 1 |
| APPLICATION NO. | : 11/507950 | |
| DATED | : May 12, 2009 | |
| INVENTOR(S) | : Frank J. Hodges | |

It is certified that error appears in the above-identified patent and that said Letters Patent is hereby corrected as shown below:

On drawing sheet 6 of 8, please replace FIG. 6 with the FIG. 6 shown below:

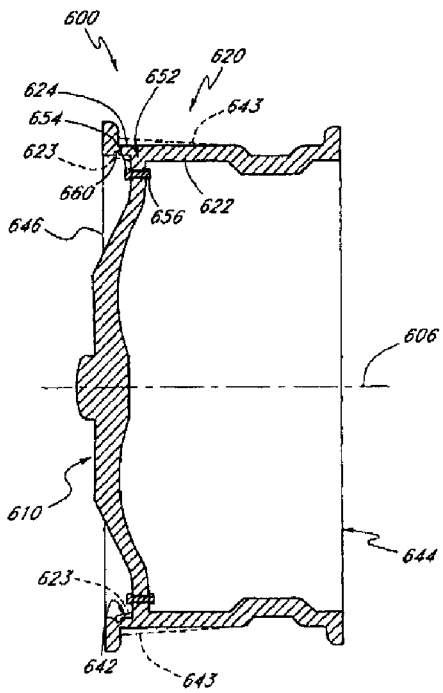

FIG. 6

Signed and Sealed this

Fifteenth Day of December, 2009

David J. Kappos
*Director of the United States Patent and Trademark Office*